Jan. 12, 1965 J. J. SAINSBURY 3,165,648

TIMING CIRCUITS PROVIDING CONSTANT TIME DELAY INDEPENDENT OF VOLTAGE SUPPLY VARIATIONS

Filed July 25, 1962 2 Sheets-Sheet 1

Inventor
JEFFREY J. SAINSBURY
By
Holcombe, Wetherill & Brisebois
Attorney

Inventor
JEFFREY J. SAINSBURY
By
Holcombe, Wetherill & Brisebois
Attorney

United States Patent Office 3,165,648

Patented Jan. 12, 1965

3,165,648

TIMING CIRCUITS PROVIDING CONSTANT TIME DELAY INDEPENDENT OF VOLTAGE SUPPLY VARIATIONS

Jeffrey Jerome Sainsbury, Bedford, England, assignor to Fords (Finsbury) Limited, Bedford, England, a British company Filed July 25, 1962, Ser. No. 212,423

Claims priority, application Great Britain, July 25, 1961, 26,899/61

14 Claims. (Cl. 307—88.5)

Figure 1:
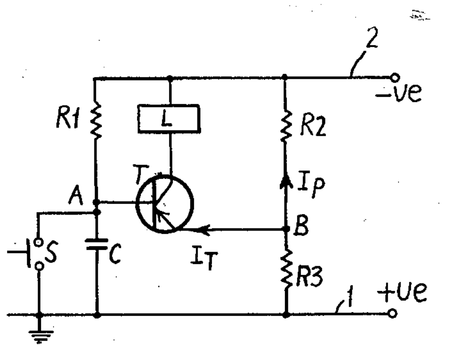

The present invention relates to an electronic timing circuit producing a time delay which is substantially independent of variations in the supply voltage.

Timing circuits normally require the supply voltage to be stabilised in order to avoid variations in the time delay. The present invention has for an object to provide an electronic timing circuit giving a time delay which remains substantially constant over a wide range of supply voltages without requiring voltage stabilisation.

The invention consists in an electronic timing circuit comprising a transistor having its emitter maintained at a potential which is a predetermined percentage of the voltage of a D.C. source and having its base biassed by being connected to a tapping between a resistor and a condenser connected in series across said D.C. source, the arrangement being such that the emitter-base junction is biassed in the reverse direction when the condenser is discharged, whereby the time interval between the instant when the D.C. voltage is applied across the condenser in the discharged condition and the instant when the base becomes biassed to the emitter potential and the transistor conducts, depends upon the time constant of the series connected resistor and the condenser and is substantially independent of variations in the voltage of the D. C. source.

The transistor used must either have a high emitter-base breakdown voltage which is greater than the reverse voltage applied and low leakage current, or a low leakage diode must be connected in the base circuit in such a way that the diode is conducting in the forward direction when the transistor is conducting. Preferably a silicon alloy transistor, which has a high emitter-base breakdown voltage and a low leakage current, is used.

Conveniently the condenser and resistor are permanently connected across leads connecting with the D.C. source and an arrangement is provided for discharging the condenser in order to start the timing cycle. For example, the condenser may be shunted through a switch, the instant of opening of the switch determining the beginning of the time delay. Alternatively, a circuit arrangement may be provided for automatically discharging the condenser in response to a predetermined signal and for allowing the condenser to commence charging on termination of the signal.

The current through the collector circuit when the transistor conducts may be employed to operate a relay or other device for producing a control or indication at the end of a time interval. Means may be provided for amplyfying the collector current to operate the relay or the like.

A feature of the invention consists in employing the voltage drop across the relay or another resistive component in the output circuit, when the transistor starts to conduct, to increase the bias on the base to produce a regenerative action and ensure immediate operation of the relay or the like at the end of the timing period.

Figure 2:
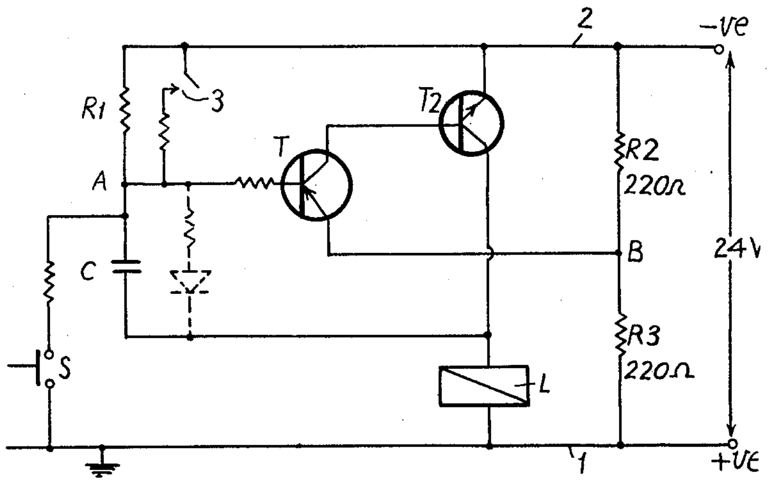
Figures 3, 4:
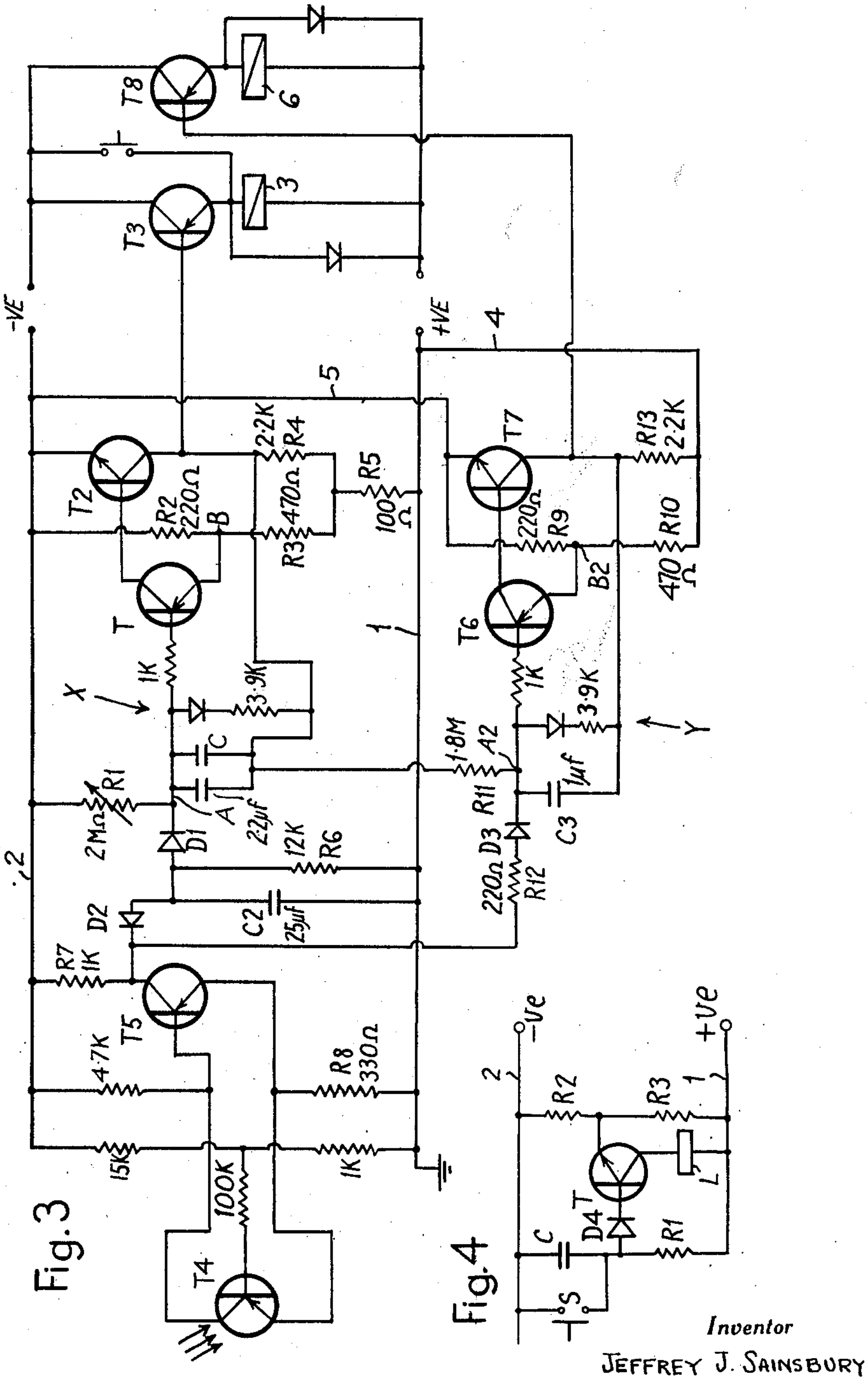

In order that the present invention may be more clearly understood, reference will now be made to the accompanying drawings in which:

FIGURE 1 shows the circuit on which an electronic timer according to the invention is based, FIGURE 2 shows a circuit according to the invention, FIGURE 3 shows another circuit according to the invention which is particularly adapted for controlling the operation of bottle-capping apparatus, and FIGURE 4 shows a modification of the circuit shown in FIGURE 2.

Referring to FIGURE 1, the basic circuit comprises three resistors R1, R2, R3, a silicon alloy transistor T and a condenser C. The resistors R2, R3 are bridged across the positive and negative leads 1, 2 from a D.C. supply source so that the point B therebetween is maintained at a predetermined percentage of the potential of the supply source. Point B is connected to the emitter of the transistor, the collector being connected through the load L to the negative lead 2. The base of the transistor is connected to the point A between the resistor R1 and the condenser C bridged in series across the leads 2, 1 with the condenser C connected between the base and the positive lead 1 and the resistor R1 between base and the negative lead 2. A start switch S is connected between the point A and the positive lead 1.

When the start button is depressed, the condenser C discharges and the point A is at earth potential. The emitter-base junction is then biassed in the reverse direction and no current flows through the transistor. When the start button S is released, the condenser C commences to charge through resistor R1 and the potential at point A increases negatively. When the potential at A equals that of B, the emitter bias changes over to normal forward bias and the transistor starts to conduct. This start of conduction is quite clearly defined provided that the voltage of the D.C. source is much greater than the forward voltage of the emitter-base junction (0.6 v.) and that the current Ip through resistor R2 is considerably greater than the maximum value of the emitter current $I_T$.

In accordance with the time constant C.R1, the voltage across the condenser will reach a given percentage of the voltage of the supply source in a predetermined time. Point B is always at a certain percentage of the applied voltage so that A will always reach this percentage in the predetermined time irrespective of variations in the supply voltage. The circuit is thus independent of the supply voltage which is particularly important in battery operated equipment. In the case of battery operated equipment, the potential divider R2–R3 could be replaced by a tapped battery.

The current in the load L of FIGURE 1 is too small for most applications and some amplification is required. This is provided in circuits according to the present invention, one of which is illustrated in FIGURE 2. Thus, in the circuit of FIGURE 2, the collector of the transistor T is connected to the base of a second transistor T2 which is an N-P-N type transistor. The emitter of the transistor T2 is connected to the negative lead 2 and its collector is connected to the positive earth lead 1 through the load L which may be a relay coil.

It will be seen that, in accordance with the invention, the condenser C is also connected to the lead 1 through the load L. This does not affect the timing since the relay is not energised during this period and the resistance of the relay coil is very small compared with R1. When the transistor T commences to conduct at the end of the timing period, it causes the transistor T2 to conduct and the potential difference across the relay L therefore rises. This rise is fed to the base of transistor T and a regenerative action takes place which ensures that the relay remains energised, and more clearly defines the end of the time delay.

In one particular embodiment of the circuit of FIGURE 2, with $R1=4.4M$ and $C=4$ mfd., the time period was 15 seconds with a supply voltage of 24 volts. On reducing the voltage to 12 volts, the increase in the time period was less than 0.5 seconds.

The circuit of FIGURE 2 can be provided with hold-in contacts 3 or can be arranged to hold itself in, without the use of hold contacts, by shunting the condenser C with a diode and resistor as shown in dotted lines.

The circuit is substantially independent of variations in transistor characteristics. It is stable to temperature changes over a wide range of temperatures, particularly for shorter time delays. By sacrificing accuracy, it is possible to obtain long time delays for fairly small values of R1 and C. This is achieved by holding point B at a higher percentage of the applied voltage, time delays of 2CR or 3CR being possible while still retaining reasonable accuracy. Time delays of over four minutes have been achieved with $R$=35M, $C$=4 mfd. with a potential at B of −18 v.

The circuit can be used as a photographic timer or as a photo-delayed relay. It may be used as a pulse generator with a long "space" time, if required.

FIGURE 3 illustrates a circuit according to the present invention for controlling the operation of the cap-making machine of bottle capping apparatus in which bottle caps pass down a chute from this machine to the bottle-capping machine.

The circuit of FIGURE 3 embodies two timing circuits, generally indicated at X and Y, similar to that shown in FIGURE 2. The first timing circuit X is arranged to stop the cap-making machine, in response to the signal from a photocell device, when the caps have piled-up to a predetermined height in the chute, and then to delay restarting of the cap-making machine for a predetermined time after the caps have cleared the photocell. The second timing circuit Y is arranged to stop the cap-making machine in the event that the latter, when operating, is not feeding caps to the chute.

In the first timing circuit, the condenser C is shown as a pair of parallel-connected condensers and the resistor R1 as a variable resistor. The latter enables the time constant of the condenser C, and thus the time delay determined by the circuit, to be altered. The load producing the regenerative action comprises two resistors R4 and R5, resistor R5 also forming part of the potential divider R2–R3. Relay 3, which has normally open contacts, controls starting and stopping of the cap-making machine and is located in the emitter circuit of the transistor T3 connected as shown and forming a second amplifying stage of the circuit X.

Charging and discharging of the condenser C is under the control of a circuit comprising a phototransistor T4, a transistor T5, two diodes D1 and D2, a resistor R6 and a condenser C2. C2 and R6 are connected in parallel between the positive lead 1 and the anode of the diode D1 which has its cathode connected to the point A. The photo-transistor T4 is connected across the D.C. source and to the transistor T5, as shown, the latter being held non-conducting when the light beam impinges on the photo-transistor. The collector of T5 is connected to the negative lead 2, by a resistor R7, and to the cathode of the diode D2 which has its anode connected to the anode of D1. The emitter of T5 is connected to the positive lead by a resistor R8.

In the second timing circuit the potential divider R9–R10 and the amplifying stage comprising transistor T7 are connected to the leads 1 and 2 by leads 4 and 5, and a condenser C3, which corresponds in function to the condenser C, is connected between the collector of the transistor T7 and one terminal of a resistor R11 which corresponds in function to the resistor R1 and has its other terminal connected to the collector of the transistor T2. The point A2 between the condenser C3 and resistor R11 is connected to the cathode of diode D2 through a resistor R12 and a diode D3. In this case the regenerative action is provided by a transistor R13. Relay 6, which has normally closed contacts, controls starting and stopping of the cap-making machine and is located in the emitter circuit of a transistor T8 connected as shown and forming a second amplifying stage of the timing circuit Y.

Both timing circuits incorporate a hold-in arrangement in which their respective condensers C and C3 are shunted by a diode and resistor connected in series.

The condenser C2 charges through diode D2 and when this condenser is charged, the diode D1 is cutoff, the condenser C is charged and the transistors T and T2 are conducting. Interruption of the light beam associated with the photo-transistor T4 causes T4 to produce a signal which in turn causes the transistor T5 to conduct. The diode D2 is then cut-off and the condenser C2 thus commences to discharge through the resistor R6. When the bottle caps fall straight through the light beam, the signal produced is of insufficient time to allow the condenser C2 to discharge and cause the diode D1 to conduct and discharge the condenser C. However, when the light beam is interrupted for a long period, as when the bottle caps pile-up in the chute to a height above the light beam, the diode D2 is maintained cut-off and the diode D1 is maintained conducting. The condenser C thus discharges through the resistor R6, the transistors cease to conduct and the cap-making machine is stopped by opening of the contacts of relay 3. When the pile of caps no longer interrupts the light beam, the diode D2 conducts and the condenser C2 charges so that the diode D1 is cut-off to determine the beginning of the time delay before the relay 3 operates again to start the cap-making machine.

When the transistor T5 is non-conducting, and the condenser C has charged sufficiently to cause the transistors T and T2 to conduct, the condenser C3 commences to charge through the resistor R11. However, a cap falling down the chute and through the light beam causes the transistor T5 to conduct for a short period and thus the potential at the anode of diode D3 is raised and the latter conducts to discharge the condenser C3. The short periods of conduction of T5 due to falling caps are sufficient to keep the condenser C3 discharged and to prevent the transistor T6 from conducting provided that the caps follow one another down the chute at regular time intervals determined by the time constant of the condenser C3. If a cap is not followed by another within the predetermined time interval, the condenser C3 charges to a value such that the potential at point A2 equals that at point B2 and the transistor T6 conducts. The signal produced by transistor T6 conducting is amplified by transistors T7 and T8 to operate the relay 6. The contacts of relay 6 are thus opened to stop the cap-making machine.

A modified form of the basic circuit is illustrated in FIGURE 4. In this circuit, the silicon alloy, P-N-P type transistor has been replaced by a N-P-N type transistor T, for example a germanium transistor. Except for a diode D4 in the base circuit, the other components are the same as in FIGURE 1 but reconnected as necessitated by the N-P-N transistor. The diode D4 is a low leakage current silicon diode having its cathode connected to the base. It is provided in order to prevent breakdown at the emitter-base junction when the junction is biased in the reverse direction.

I claim:

1. An electronic timing circuit comprising a first transistor having an emitter, collector and base, means for maintaining said emitter at a potential which is a substantially fixed percentage of the voltage of a D.C. source, a second transistor having an emitter, collector and base, means connecting the collector of said first transistor to the base of said second transistor, resistance means, means connecting the collector of said second transistor through said resistance means to one pole of said D.C. source, means connecting the emitter of said second transistor to the other pole of said D.C. source, a resistor and condenser connected in series and having a tapping therebetween, said condenser having its side remote from said tapping connected between said resistance means and the collector of said second transistor, and said resistor having its side remote from said tapping connected to said other pole of said D.C. source, and means connecting the base of said first transistor to said tapping.

2. An electronic timing circuit as claimed in claim 1, in combination with a second electronic timing circuit comprising a third transistor having an emitter, collector and base, means for maintaining the emitter of said third transistor at a potential which is a predetermined percentage of the voltage of said D.C. source, a fourth transistor having an emitter, collector and base, means connecting the collector of said third transistor to the base of said fourth transistor, second resistance means, means connecting the collector of said fourth transistor through said second resistance means to said one pole of said D.C. source, means connecting the emitter of said fourth transistor to said other pole of said D.C. source, and a second resistor and condenser connected in series and having a tapping therebetween to which the base of said third transistor is connected, said second condenser having its side remote from said tapping connected between said fourth transistor and said second resistance means, and said second resistor having its side remote from said tapping connected between said second transistor and the first resistance means.

3. An electronic timing circuit as claimed in claim 1, including switch means operable to shunt said condenser and resistance means.

4. An electronic timing circuit as claimed in claim 1, including a circuit arrangement for automatically discharging the condenser in response to a signal and for allowing the condenser to charge on termination of said signal, said circuit arrangement comprising a diode connected to said tapping, a further condenser and resistor connected in parallel between said one pole of said D.C. source and the electrode of said diode remote from said tapping, said diode being connected so as to be cut off when said further condenser is charged, sensing means operable to produce said signal, and a further diode connected to enable charging of said further condenser therethrough in the absence of said signal and to be cut off on production of said signal.

5. An electronic timing circuit as claimed in claim 1, including means operable to discharge said condenser, and hold-in means for maintaining said first transistor conducting while said discharge means is unoperated.

6. An electronic timing circuit as claimed in claim 5, wherein said hold-in means includes a switch operable to shunt said resistor.

7. An electronic timing circuit as claimed in claim 5, wherein said hold-in means comprises a resistor and diode connected to shunt said condenser.

8. An electronic timing circuit comprising a first transistor having an emitter, collector and base, a potential divider for maintaining said emitter at a potential which is a substantailly fixed percentage of the voltage of a D.C. source, a second transistor having an emitter, collector and base, means connecting the collector of said first transistor to the base of said second transistor, a resistive load, means connecting the collector of said second transistor through said load to one end of said potential divider, means connecting the emitter of said second transistor to the other end of said potential divider, a resistor and condenser connected in series and having a tapping therebetween, said condenser having its side remote from said tapping connected between said load and the collector of said second transistor, and said resistor having its side remote from said tapping connected to said other end of said potential divider, means connecting the base of said first transistor to said tapping, and a circuit arrangement for automatically discharging the condenser in response to a signal and for allowing the condenser to charge on termination of said signal.

9. An electronic timing circuit as claimed in claim 8, wherein said circuit arrangement comprises a second condenser, a second resistor, a diode connected to said tapping, and means connecting said second resistor and condenser in parallel between said one end of said potential divider and said diode, said diode being connected so as to be cut-off when said second condenser is charged.

10. An electronic timing circuit as claimed in claim 9, including sensing means operable to produce said signal, and a second diode connected to allow charging of said second condenser in the absence of said signal and to be cut-off on production of said signal.

11. An electronic timing circuit as claimed in claim 10, in combination with a second electronic timing circuit comprising a third transistor having an emitter, collector and base, a second potential divider connected across the first potential divider for maintaining the emitter of said third transistor at a potential which is a substantially fixed percentage of the voltage of said D.C. source, a fourth transistor having an emitter, collector and base, means connecting the collector of said third transistor to the base of said fourth transistor, a second resistive load, means connecting the collector of said fourth transistor through said second load to said one end of said first divider, means connecting the emitter of said fourth transistor to said other end of said first divider, a third resistor and condenser connected in series and having a tapping therebetween to which the base of said third transistor is connected, said third condenser having its side remote from said tapping connected between said second load and said fourth transistor, and said third resistor having its side remote from said tapping connected between said second transistor and the first resistive load, and means including a third diode connecting said tapping to a point between said second diode and said sensing means.

12. An electronic timing circuit as claimed in claim 11, wherein said first and third transistors are silicon alloy transistors.

13. An electronic timing circuit as claimed in claim 1, wherein said first transistor is a silicon alloy transistor.

14. An electronic timing circuit as claimed in claim 1, wherein the means connecting the base of said first transistor to said tapping includes rectifier means arranged so as to be conducting in the forward direction when the transistor is conducting.

References Cited in the file of this patent

UNITED STATES PATENTS

| | | |
|---|---|---|
| 3,049,627 | Higginbotham | Aug. 14, 1962 |
| 3,081,419 | Simon | Mar. 12, 1962 |